(No Model.)
O. W. BURNELL.
WIND LOCOMOTIVE.
No. 271,784. Patented Feb. 6, 1883.
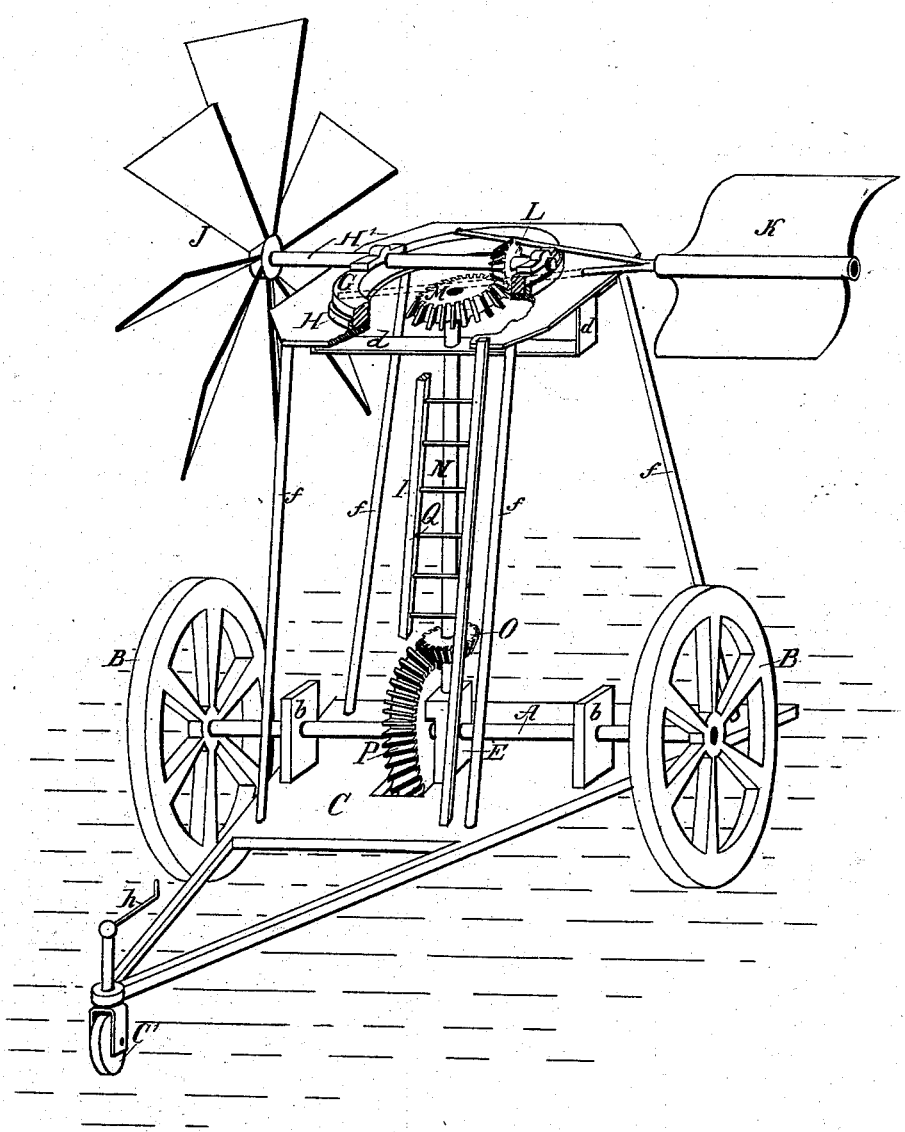
WITNESSES:
Otto Beyer
C. Sedgwick
INVENTOR:
O. W. Burnell
BY Munn & Co
ATTORNEYS.

UNITED STATES PATENT OFFICE.

OSCAR WILMINGTON BURNELL, OF DORRANCE, KANSAS.

WIND-LOCOMOTIVE.

SPECIFICATION forming part of Letters Patent No. 271,784, dated February 6, 1883.

Application filed November 27, 1882. (No model.)

*To all whom it may concern:*

Be it known that I, OSCAR W. BURNELL, of Dorrance, in the county of Russell and State of Kansas, have invented a new and Improved Wind-Locomotive, of which the following is a full, clear, and exact description.

My invention relates to the application of wind-wheels to wagons, carts, and other land vehicles for the propulsion thereof, and to machines for performing heavy farm work—such as plowing, harrowing, drilling, &c.—to take the place of steam-power; and my invention consists of the combination and arrangement of parts, substantially as hereinafter fully set forth and claimed.

Reference is to be had to the accompanying drawing, in which the figure is a perspective view, showing my invention applied to a two-wheeled vehicle or cart, the same being provided with a guide-wheel for controlling the vehicle.

The vehicle part of the contrivance consists of the axle A, the two ground-wheels B B, and the guide-wheel C', which is pivoted in the forward part of the triangular body or frame C, which is secured to the axle A by means of the blocks b b and E, through which the axle passes, as shown. Above this body or frame. C is the platform F, which is supported upon the four posts f f, rising from the body or frame C, and upon this platform is placed the ring G, which is adapted to turn in the ordinary manner in the flanged seat H, formed in or upon the platform F, as shown, and in this ring G is journaled the horizontal shaft H', which carries the wind-wheel J at one end, and the vane K is attached rigidly to this ring to the arms k k.

To the shaft H' is secured the beveled cog-wheel L, which meshes with the large beveled cog-wheel M, secured to the upper end of the vertical shaft N, and to the lower end of this vertical shaft N is fixed the beveled cog-wheel O, which meshes with the large beveled cog-wheel P, fixed to the axle A. The vertical shaft N is journaled at its upper end in the plate d, secured to the under side of the platform F, and at its lower end in the said post or block E, rising from the body C, as shown.

The ground-wheels B B are clutched upon the axle A, so that the forward rotary motion imparted to the axle from the wind-wheel J and shaft H' through the vertical shaft N and the gearing just described will cause the wheels to turn with the axle, and thus propel the vehicle forward along the ground, but will permit the axle A to turn backward independent of the wheels.

The guide-wheel C' is provided with the crank h, by which the wheel C' can be turned to give the vehicle any desired direction.

Leading from the frame C to the platform F above is the ladder Q, by which a person can easily ascend to the platform F for repairing or oiling the machinery or for any other purpose. Instead of having the axle A pass above frame C, it may be made to pass under it, if desired.

Having thus described my invention, I claim as new and desire to secure by Letters Patent—

In a wind vehicle or locomotive, the combination, with the shaft A, secured to the wheels B, and carrying the gear-wheel P, and the upright shaft N, carrying the beveled pinions M O, of the shaft H', journaled in the ring G, said ring being adapted to move in a coincident flanged seat, H, and said shaft H' having a beveled pinion, L, gearing with the pinion M of the shaft N, and the vane K, fixed to the ring G, as shown and described, and for the purpose set forth.

OSCAR WILMINGTON BURNELL.

Witnesses:
T. BURNELL,
S. J. NEWKIRK.